United States Patent
Reddy et al.

(10) Patent No.: US 9,922,059 B1
(45) Date of Patent: Mar. 20, 2018

(54) CASE MODEL—DATA MODEL AND BEHAVIOR VERSIONING

(71) Applicant: Open Text Corporation, Waterloo (CA)

(72) Inventors: Satyapal P. Reddy, Fremont, CA (US); Muthukumarappa Jayakumar, Mountain House, CA (US); Ravikumar Meenakshisundaram, Pleasanton, CA (US); Gary Frankel, Nevada City, CA (US)

(73) Assignee: Open Text Corporation, Waterloo (CA)

( * ) Notice: Subject to any disclaimer, the term of this patent is extended or adjusted under 35 U.S.C. 154(b) by 304 days.

(21) Appl. No.: 14/502,066

(22) Filed: Sep. 30, 2014

Related U.S. Application Data

(60) Provisional application No. 62/031,590, filed on Jul. 31, 2014.

(51) Int. Cl.
G06F 17/30 (2006.01)

(52) U.S. Cl.
CPC .............................. *G06F 17/30309* (2013.01)

(58) Field of Classification Search
None
See application file for complete search history.

(56) References Cited

U.S. PATENT DOCUMENTS

| | | |
|---|---|---|
| 5,280,610 A | 1/1994 | Travis, Jr. et al. |
| 5,500,802 A | 3/1996 | Morris |
| 5,504,892 A | 4/1996 | Atsatt et al. |
| 5,907,704 A | 5/1999 | Gudmundson et al. |
| 7,428,699 B1 | 9/2008 | Kane |
| 8,706,776 B1 | 4/2014 | Kraft et al. |
| 9,224,132 B1 | 12/2015 | Knox et al. |
| 9,411,798 B1 | 8/2016 | He et al. |
| 9,652,478 B2 | 5/2017 | Gupta |
| 2002/0104068 A1 | 8/2002 | Barrett et al. |
| 2003/0018698 A1 | 1/2003 | Abraham et al. |
| 2003/0055668 A1 | 3/2003 | Saran et al. |
| 2003/0088593 A1 | 5/2003 | Stickler |
| 2004/0163048 A1 | 8/2004 | McKnight |
| 2005/0010504 A1 | 1/2005 | Gebhard et al. |
| 2005/0131924 A1 | 6/2005 | Jones |
| 2007/0233709 A1* | 10/2007 | Abnous ............. G06F 17/30607 |
| 2007/0294272 A1 | 12/2007 | Anderson et al. |
| 2009/0119594 A1 | 5/2009 | Hannuksela |

(Continued)

OTHER PUBLICATIONS

Office Action for U.S. Appl. No. 14/502,132, mailed Nov. 18, 2016, 8 pgs.

(Continued)

*Primary Examiner* — Syed H Hasan
(74) *Attorney, Agent, or Firm* — Sprinkle IP Law Group

(57) ABSTRACT

Case management systems and techniques are disclosed. In various embodiments, a first version of a case model and a second version of the case model are stored, the second version having in common with the first version at least a subset of a case model definition comprising the first version of the case model. The first version of the case model is associated with a first set of case instances associated with the case model, and the second version of the case model is associated with a second set of case instances associated with the case model.

20 Claims, 14 Drawing Sheets

(56) References Cited

U.S. PATENT DOCUMENTS

| | | |
|---|---|---|
| 2009/0171897 A1 | 7/2009 | Spinola |
| 2009/0287658 A1* | 11/2009 | Bennett ............ G06F 17/30867 |
| 2009/0326694 A1 | 12/2009 | Stephens |
| 2010/0161362 A1 | 6/2010 | Shapira et al. |
| 2010/0299678 A1 | 11/2010 | Taylor |
| 2010/0306638 A1 | 12/2010 | Oleksy |
| 2011/0270740 A1 | 11/2011 | Pickett |
| 2012/0131445 A1 | 5/2012 | Oyarzabal et al. |
| 2012/0185791 A1 | 7/2012 | Claussen et al. |
| 2013/0151535 A1 | 6/2013 | Dusberger et al. |
| 2014/0114671 A1 | 4/2014 | Hu et al. |
| 2014/0114673 A1 | 4/2014 | Hu |
| 2014/0330612 A1 | 11/2014 | Lemcke |
| 2015/0278717 A1 | 10/2015 | Pasupathi |
| 2016/0019243 A1 | 1/2016 | Kamel et al. |

OTHER PUBLICATIONS

Office Action for U.S. Appl. No. 14/502,106, mailed Jan. 27, 2017, 15 pgs.
Office Action for U.S. Appl. No. 15/502,159, mailed Jan. 30, 2017, 52 pgs.
Office Action for U.S. Appl. No. 14/502,025, dated May 17, 2017, 19 pgs.
Office Action for U.S. Appl. No. 14/502,106, dated May 17, 2017, 21 pgs.
Office Action for U.S. Appl. No. 14/502,132, dated Jun. 19, 2017, 12 pgs.
Office Action for U.S. Appl. No. 14/502,159, dated Aug. 31, 2017, 70 pgs.
Office Action for U.S. Appl. No. 14/502,322, dated May 1, 2017, 13 pages.
Office Action for U.S. Appl. No. 14/502,361, dated Jun. 28, 2017, 13 pages.
Office Action for U.S. Appl. No. 14/502,281, dated Oct. 7, 2016, 12 pages.
Office Action for U.S. Appl. No. 14/502,281, dated Jul. 12, 2017, 17 pages.
Office Action for U.S. Appl. No. 14/502,322, dated Oct. 6, 2017, 14 pages.
Office Action for U.S. Appl. No. 14/502,132, dated Nov. 21, 2017, 17 pages.
Office Action for U.S. Appl. No. 14/502,025, dated Dec. 4, 2017, 31 pages.
Office Action for U.S. Appl. No. 14/502,106, dated Nov. 29, 2017, 25 pages.
Office Action for U.S. Appl. No. 14/502,281, dated Dec. 14, 2017, 22 pages.
Office Action for U.S. Appl. No. 14/502,361, dated Jan. 8, 2018, 24 pgs.

* cited by examiner

US 9,922,059 B1

CASE MODEL—DATA MODEL AND BEHAVIOR VERSIONING

CROSS REFERENCE TO OTHER APPLICATIONS

This application claims priority to U.S. Provisional Patent Application No. 62/031,590, entitled CASE MODEL CREATION, CONTENT, AND BEHAVIOR, filed Jul. 31, 2014, which is incorporated herein by reference for all purposes.

BACKGROUND OF THE TECHNOLOGY

Case management systems, software, and/or cloud-based or other electronically-provided case management services (collectively, "Case Management Systems") are used to automate the management of complex sets of documents or other content and associated business or other processes, particularly in situations in which the documents or other content that may need to be managed for respective particular instances of a case model/type (e.g., a loan application) may not be the same for each instance and the processing required and/or selected to be performed may not be the same for each instance.

A case model ("Case Model") typically describes a type of case, instances of which are to be managed by a Case Management System. As opposed to very structured business process that defines a predetermined work flow that does not vary from instance to instance, using a Case Model one can model ad hoc actions and define responses thereto with mini workflows, enabling the processing of respective instances of a Case Model to be determined dynamically at runtime based, e.g., on events, context data, user input, dynamic evaluation of documents or other content, etc. As a result, each instance of a Case Model (e.g., the respective loan applications of different applicants) may follow its own course as determined at each step by processing as defined in applicable portions of the Case Model.

BRIEF DESCRIPTION OF THE DRAWINGS

Various embodiments of the technology are disclosed in the following detailed description and the accompanying drawings.

DETAILED DESCRIPTION

The technology can be implemented in numerous ways, including as a process; a system; a computer program product embodied on a computer readable storage medium; and/or a processor, such as a processor configured to execute instructions stored on and/or provided by a memory coupled to the processor. In general, the order of the steps of disclosed processes may be altered within the scope of the technology. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the technology is provided below along with accompanying figures that illustrate the technology. The technology is described in connection with such embodiments, but the technology is not limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of example and the technology may be practiced according to the claims without some or all of these specific details.

Case model versioning is disclosed. In various embodiments, a case management system supports defining different versions of a same case model. Different versions of a case model may include differences in the data model, behaviors, and/or other differences. Case instances based on a case model may have associated therewith a case model version number or other value, indicating which version of the case model should be used to provide that instance. For example, upon creation of a new case instance, a version number or other value may be associated with the instance and included in the case instance data stored for the instance. Upon subsequent instantiation of a previously-created instance, the version data may be read and used to determine a version of the case model to be used to generate and provide access to the runtime instance. In various embodiments, support of case model versioning enables a same case model to be used for instance created over a period of time and/or across enterprise, regulatory, and/or other domains, with different versions of the case model being used as appropriate to ensure that each case instance provides the functionality and processing required for that instance.

Figure 1:
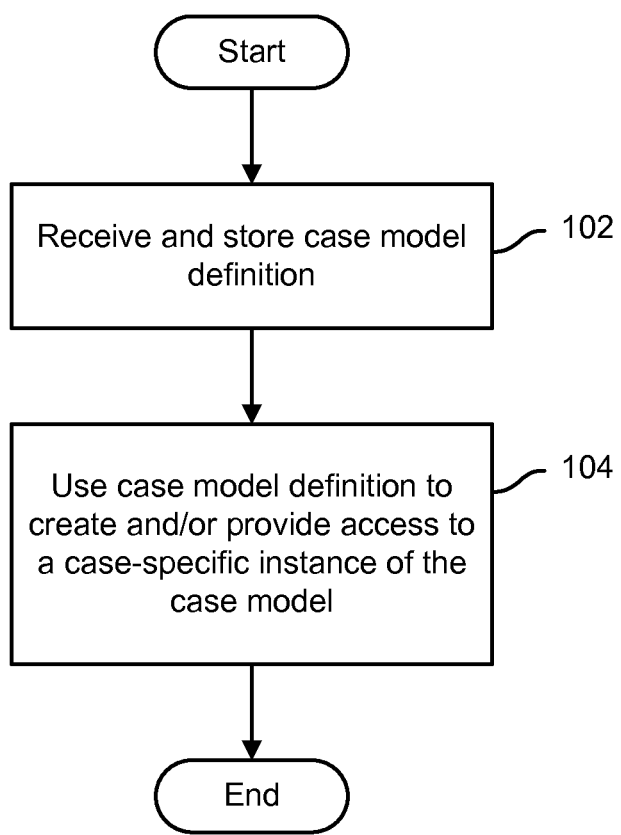
FIG. 1 is a flow chart illustrating an example embodiment of a process to perform case management.

FIG. 1 is a flow chart illustrating an embodiment of a process to perform case management. In the example shown, a case model definition is received and stored (102). The case model definition is used to create new instances based on the case model, sometimes referred to herein as "case instances" or "case management instances", and/or to provide access to previously-created instances (104). For example, a case model may be defined and stored for a loan application and associated processes. Case instances may be created based on the case model and each respective case instance used to manage a corresponding loan application, for example by different respective loan applicants.

A case model typically describes a case management system. Using a case model, one can model ad hoc actions with mini workflows, for example, as opposed to very structured process that defines an end-to-end business workflow. In various embodiments, a case model comprises a hierarchical/nested container model (sometimes referred to herein as a "hierarchical data model"), and may in addition define case roles, case phases (states), and/or permissions. In some embodiments, permissions may be defined for each case node and/or level in the hierarchy, and may vary in some embodiments based at least in part on the respective phases (states) of a state machine defined for a case node.

In various embodiments, a case model may include a hierarchical/nested container model. This model represents how the data with in a case is organized and what data is captured during runtime. Each node in the hierarchy is sometimes referred to herein as a "case node". Case nodes at the lowest level of a case model hierarchy may be referred to as "case leaf nodes" or simply "leaf nodes". "Case leaf nodes" in various embodiments may point to a specific business object or document type.

The term "case role" is used herein to refer to user roles that have been defined in a case model. In various embodiments, users may be assigned to case roles with respect to instances of a case model, and at each case node in the case model permissions may be designated by reference to one or more case roles. During runtime in some embodiments members may be added or removed from these roles at case node instances corresponding to respective instances of a type of case as defined in a case model.

In various embodiments, at each case node a metadata model that defines one or more traits and/or associated behavior may be defined.

In various embodiments, a case model as described herein may be created using a domain-specific or other development module or tool. For example, reusable elements, such sample case nodes typical of those used in the domain (e.g., documents, case roles, behaviors, etc. Typically associated with a loan application process, a new drug approval application, etc.), primitives usable to define a state machine and/or associated processing for respective case nodes, etc., may be provided. For example, an application programming interface (API) may be defined, and/or a visual or other case model development tool may be provided.

In various embodiments, a case model definition is embodied in an eXtensible Markup Language (XML) or other structured data file. A case management system and/or platform is provided, which is configured (e.g., by software) to load a case model definition, parse the definition, and create an instance of the case model based on the definition. Instance-specific attributes and/or state information or other metadata may be stored in a case model instance data store, e.g., a database. At runtime, the case model definition file and the case model instance data for a given instance are used by the disclosed case management system to implement the case model instance, including by performing processing and managing case model instance associated content per the case model definition, in light of the current values of the case model instance data for that instance.

Figure 2:
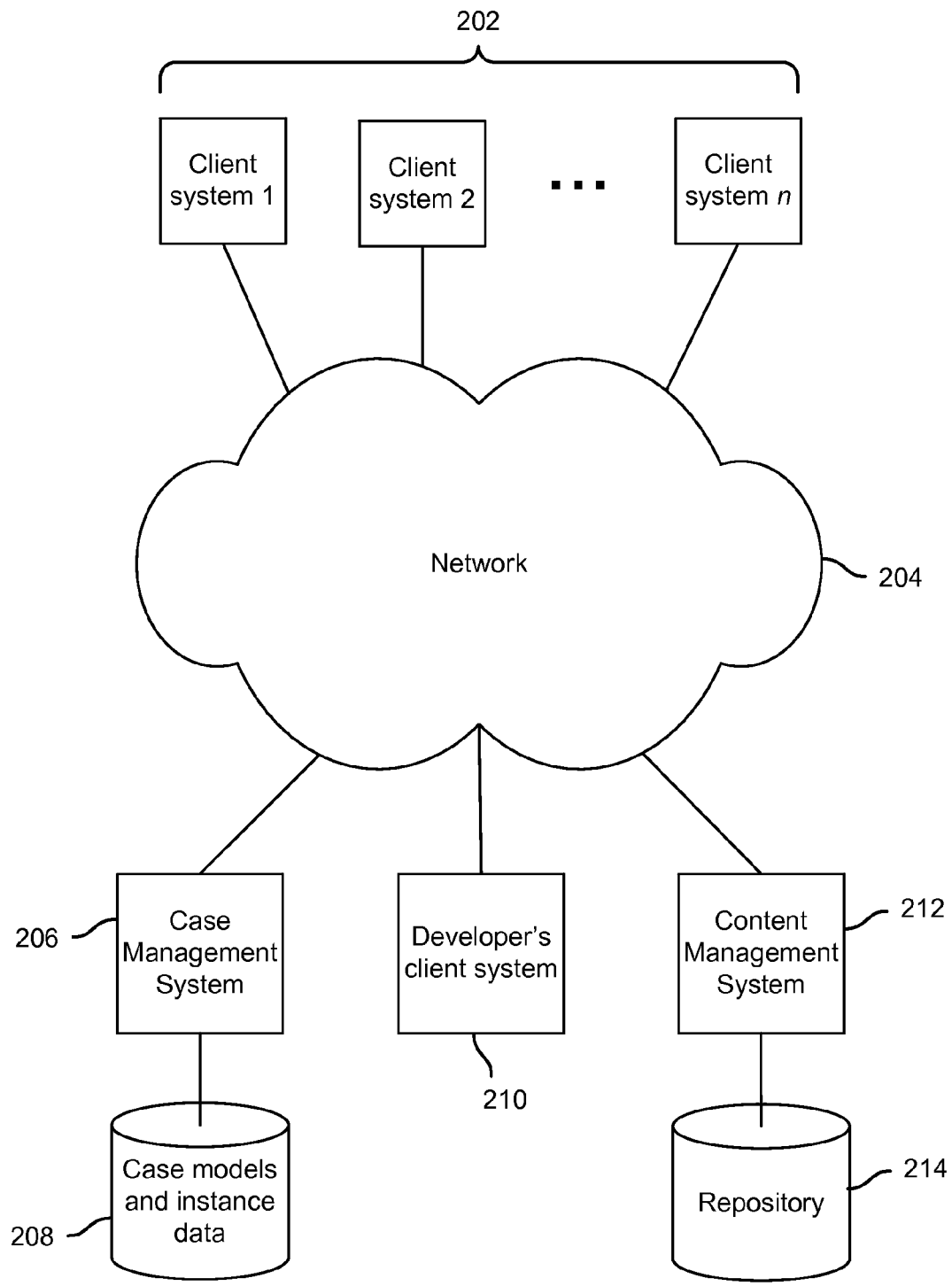
FIG. 2 is a block diagram illustrating an example embodiment of a case management system and environment.

FIG. 2 is a block diagram illustrating an embodiment of a case management system and environment. In the example shown, client systems 202 are connected via a network 204, e.g., the Internet, to a case management system 206. In various embodiments, the case management system 206 may be configured to implement the process of FIG. 1. Case management system 206 uses case models stored in data storage 208 to provide case management services with respect to case management instances, the instance variable data values of which also are stored, in this example, in data storage 208. For example, one or more of clients 202 may connect via network 204 to case management system 206 to obtain access to case management services. For example, case management system 206 may expose a "case management system as a service", e.g., as a web service, enable clients 202 to connect to case management system 206, create case management instances based on case models stored in data storage 208. The users of client system 202 may be prompted to provide data values and/or other user input to populate case management instances with metadata, user data, documents, etc., and/or such other user input as may be required to advance case instances through case management processing as defined in the case model.

In the example shown in FIG. 2, a case model developer system 210, e.g., a client computer system, also can connect to case management system 206 via network 204. In some embodiments, a case model development user interface and/or service may be accessed and used to define a case model. For example, a visual or other developer tool may be presented to enable a developer using client system 210 to define a case model and cause the case model to be stored in data storage 208 and deployed by case management system 206. In some embodiments, deployment of a case model includes making the case model available to be used to create case management instances based on the model, and to use the case model to perform with respect to each such instance the case management processing as defined in the case model.

In various embodiments, a case model may indicate one or more content objects to be associated with respective instances of a case model. The case model may include metadata and associated behaviors to enable instance-specific content objects (e.g., documents) to be associated with case leaf nodes of a case instance. In the example shown in FIG. 2, content objects may be accessed via a content management system 212 configured to manage content objects stored in an associated content repository 214. In various embodiments, case management system 206 may be configured to use instance variables associated with a given case instance and metadata and/or behaviors defined in an associated case model to interact programmatically with content management system 212 to obtain and/or manage documents or other content objects associated with a case instance. In some embodiments, case management system 206 may be configured, e.g., via the case model, to invoke services and/or other functionality of content management system 212 with respect to such documents or other content objects.

Figure 3:
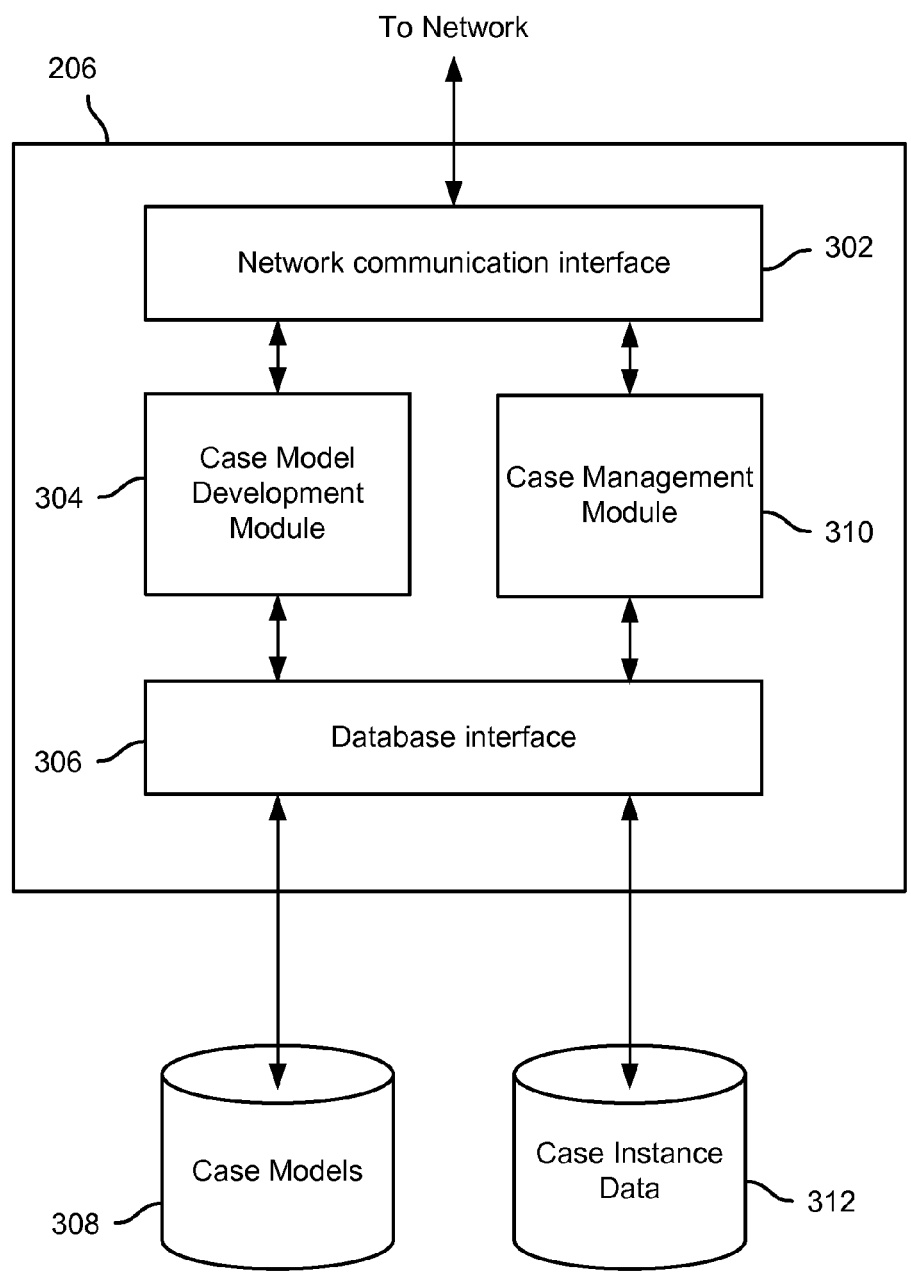
FIG. 3 is a block diagram illustrating an example embodiment of a case management system.

FIG. 3 is a block diagram illustrating an embodiment of a case management system. In some embodiments, the case management system of FIG. 3 corresponds to case management system 206 of FIG. 2. In the example shown, case management system 206 includes a network communication interface 302, such as a wireless or other network interface card, to provide network connectivity, e.g., to network 204 of FIG. 2. A case model development module 304 is accessible to developers via network communication interface 302 and may be used to create and/or modify case model definitions. In some embodiments, a visual or other user interface is provided, via network communication interface 302, to enable case models to be created and/or modified. For example, a developer may use a browser to access the developer user interface in some embodiments. Case model definitions are stored by case model development module 304 by using a backend database (or other data storage) interface 306 to store the case model(s) in case model store 308.

Referring further to FIG. 3, the case management system 206 includes a case management module 310. In various embodiments, case management module 310 includes functionality to enable users, e.g., users of client systems 202 of FIG. 2, to create and/or use case management instances based on case models stored in case model store 308. Case management module 310, for example, may expose a web or other interface to remote users and may receive via said interface a request to create and/or access a case instance. Case management module 310 uses database interface 306 to obtain an associated case model definition from case model store 308, to use the case model to instantiate case instances. Instance variables are stored by case management module 310 in case instance data store 312.

Figure 4:
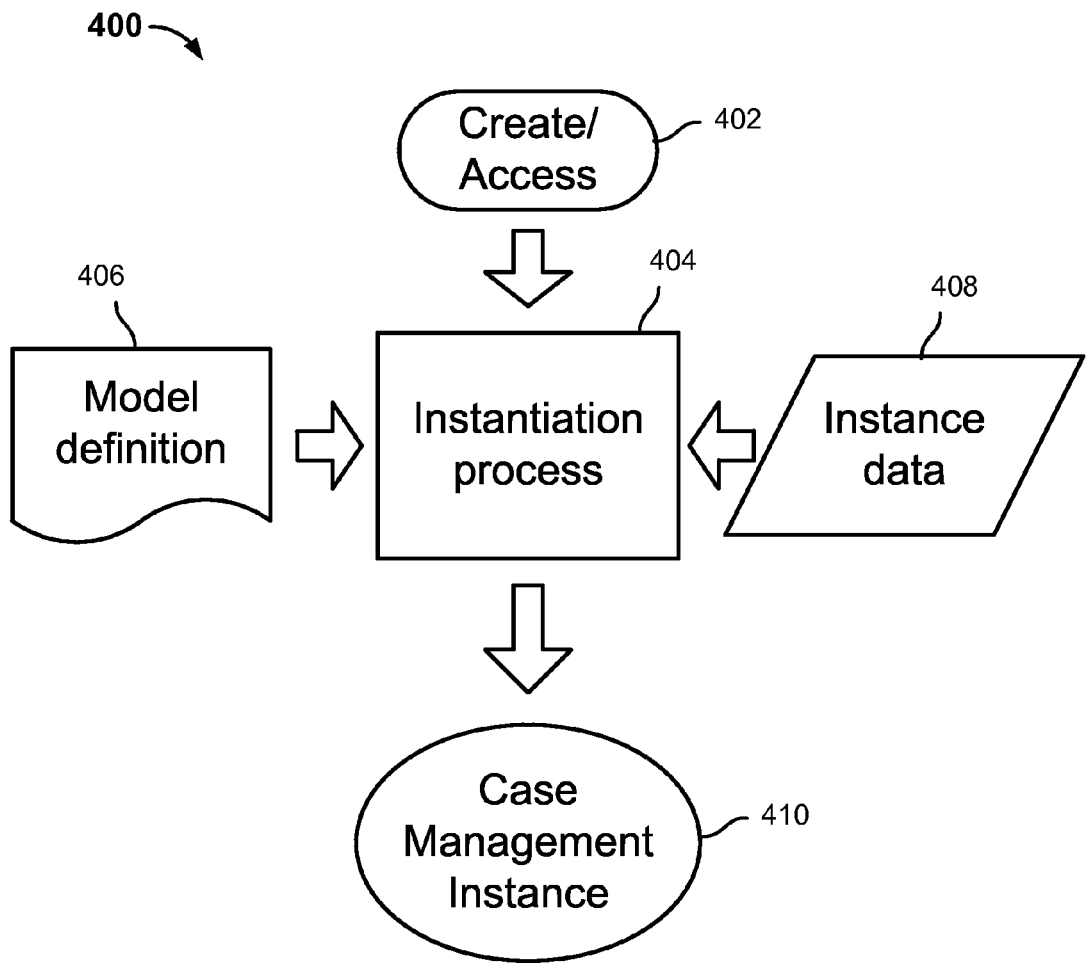
FIG. 4 is a diagram illustrating an example embodiment of a process and system to create and/or provide access to case management instances.

FIG. 4 is a diagram illustrating an embodiment of a process and system to create and/or provide access to case management instances. In some embodiments, the process of FIG. 4 may be implemented by a case management system and/or a component thereof, such as case management module 310 of FIG. 3. In the example shown, case management system 400 receives a request 402 to create or access a case management instance and invokes instantiation process 404. Instantiation process 404 uses a case model definition 406 associated with the request, e.g., a case model indicated explicitly and/or otherwise associated with data comprising the request 402, and case management instance data 408 associated with the case management instance, to instantiate and provide access to a case management instance 410.

In various embodiments, a case model definition such as model definition 406 may include an XML file or other structured data, which the case management system is configured to parse and use to construct case instances based on the case model. For example, the hierarchical data structure may be defined, along with metadata and associated behaviors for each case node. A case management instance, such as case management instance 410, may include an in memory instance of a data structure defined in case model definition 406, which is used to store instance variables, such as instance data 408 in this example.

Figure 5:
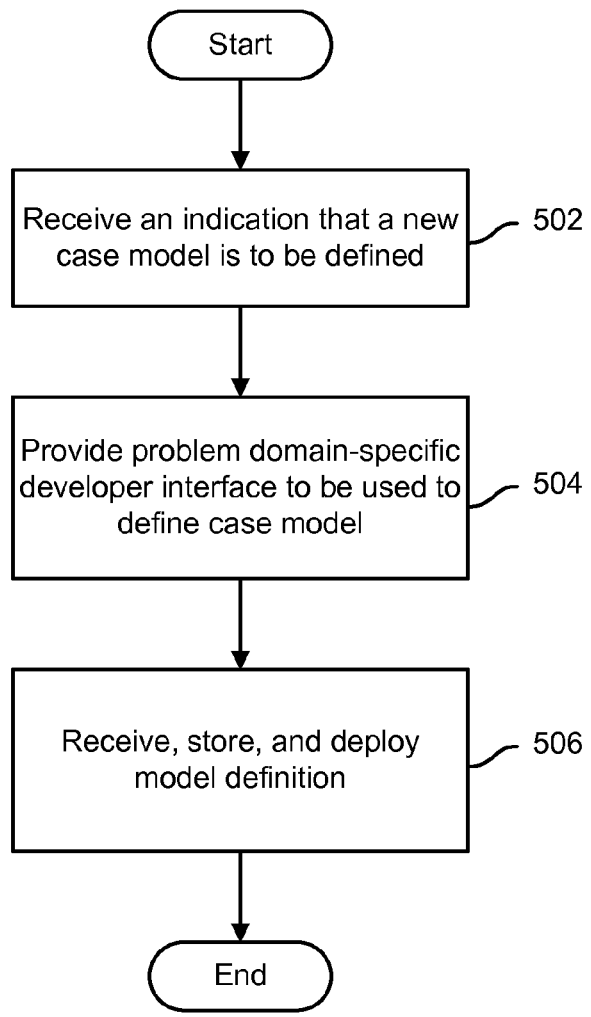
FIG. 5 is a flow chart illustrating an example embodiment of a process to receive and store a case model.

FIG. 5 is a flow chart illustrating an embodiment of a process to receive and store a case model. In some embodiments, the process of FIG. 5 is used to implement step 102 of FIG. 1 and is performed by a case management system, such as case management system 206 of FIG. 2, e.g., case model development module 304 of FIG. 3. In the example shown, an indication that a new case model is to be defined is received (502). A problem domain-specific developer interface to be used to define the case model is provided (504). For example, in some embodiments a developer may indicate in a request to define a new case model, and/or may be prompted to indicate, a "problem domain" with which the case model is associated, such as a loan application, an employment application, a product development or other business project, a healthcare or other patient, a claim for reimbursement or benefits, or a matter being handled by a professional or personal service provider, such as a lawsuit, home renovation project, etc. In various embodiments, the problem domain-specific developer interface provides access to problem domain-specific elements to assist the developer in defining the case model. For example, a loan application typically is initiated by a loan applicant submitting an application, and typically involves gathering information to verify and evaluate the applicant's identity, financial assets, income, creditworthiness, etc. In some embodiments, a template may be provided to be used as a starting point. The developer uses visual or other tools to customize the template as desired to define a case model.

Once the developer has completed and submitted the case model definition, the case model definition is received, stored, and deployed (506). In some embodiments, a runtime representation of the definition is processed, e.g., upon submission by the developer, to generate an XML or other structured data file that embodies the case model as defined. Deployment in various embodiments includes making the case model definition available to be used to instantiate case management instances based on the case model, e.g., individual loan application cases.

Figure 6:
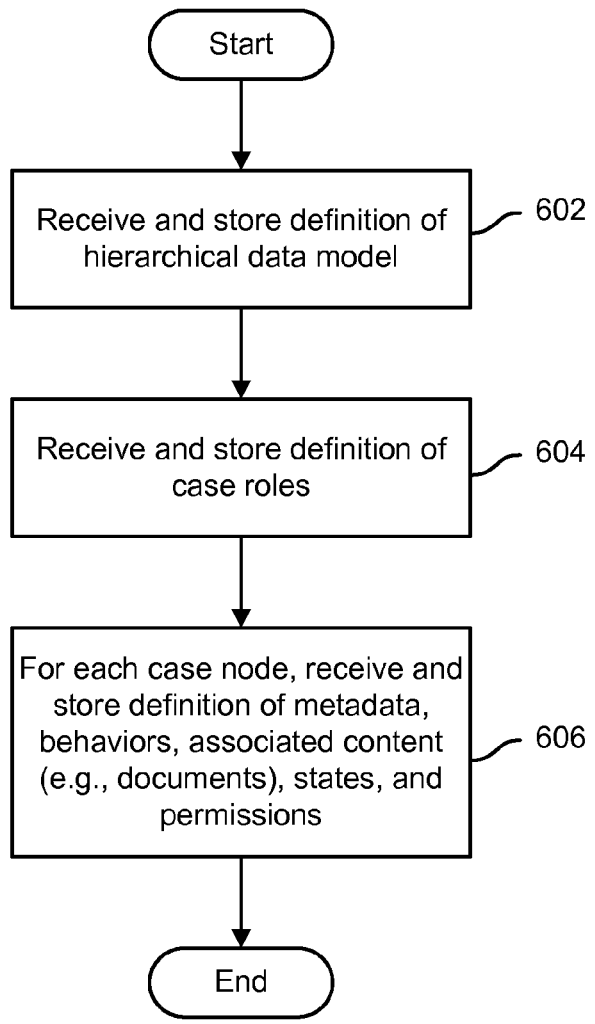
FIG. 6 is a flow chart illustrating an example embodiment of a process to receive and store a case model.

FIG. 6 is a flow chart illustrating an embodiment of a process to receive and store a case model. In some embodiments, the process of FIG. 6 is included in step 506 of FIG. 5. In the example shown, a definition of a hierarchical/nested data model is received (602). For example, a user interface that enables a developer to drag and drop case nodes onto a canvass and to indicate hierarchical relationships between case nodes may be provided and used by the developer to define a hierarchical/nested data model. A definition of case roles is received and stored (604). For example, a "loan application" case model may include user roles such as "loan initiator", "underwriter", "appraiser", etc. For each case node in the hierarchical/nested data model, a definition of metadata, behaviors, content (e.g., documents), states/phases (and transitions between states/phases), and/or permissions (e.g., by case role) is received (606). For example, in various embodiments a developer interface may be provided to enable a developer to select a case node and be presented with an interface to define a state machine for that case node.

Figure 7:
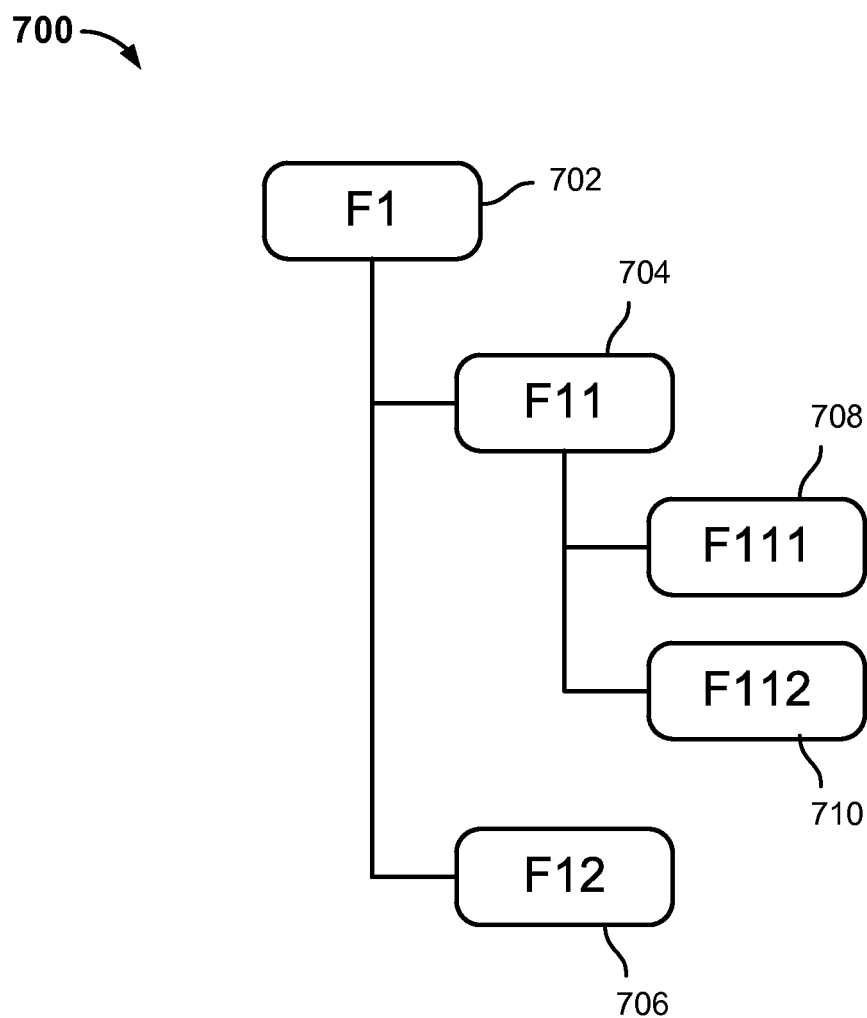
FIG. 7 is a block diagram illustrating an example of a hierarchical data model in an embodiment of a case management system.

FIG. 7 is a block diagram illustrating an example of a hierarchical data model in an embodiment of a case management system. In various embodiments, a case model, such as one defined using the processes of FIGS. 5 and 6, may include a hierarchical/nested container model, such as the one shown in FIG. 7. In the example shown, hierarchical/nested container model 700 includes a root node 702 at a first (highest) hierarchical level. At a first hierarchical level below the root node, nodes 704 and 706 are included. Finally, in a lowest hierarchical level (in this example), node 704 has two "case leaf nodes" 708 and 710. In various embodiments, metadata, behaviors, permissions, etc. that have been defined for a case node extend (or in some embodiments may at the option of the case model developer be extended) to child case nodes of the case node at which such metadata, behaviors, permissions, etc. have been defined.

Figure 8:
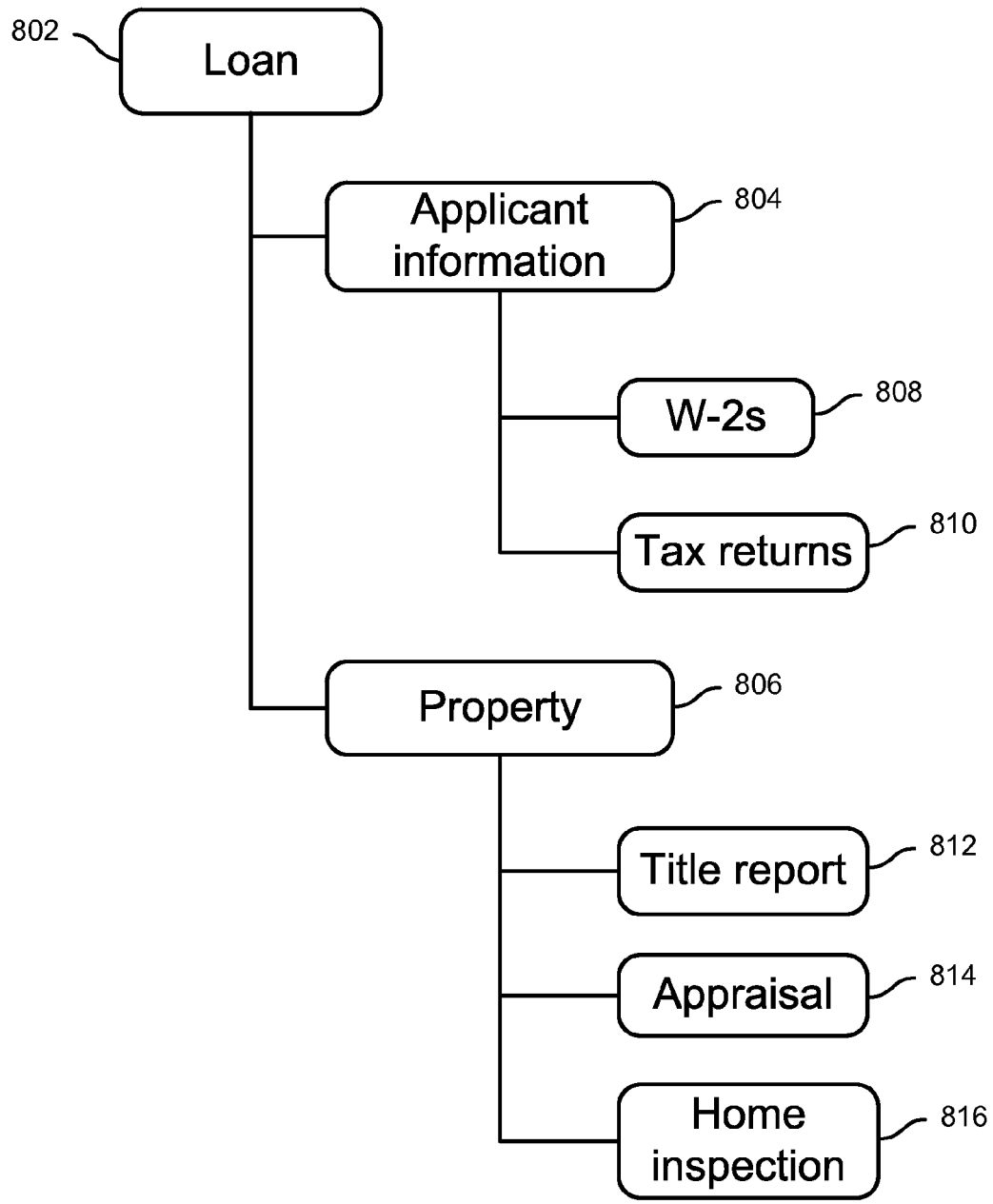
FIG. 8 is a block diagram illustrating an example of a hierarchical data model in an embodiment of a case management system

FIG. 8 is a block diagram illustrating an example of a hierarchical data model in an embodiment of a case management system, such as case management system 206 of FIG. 2. In particular, a hierarchical/nested container model for a home loan application is illustrated. In the example shown, each instance of a "loan" case includes a root node 802 and two first level sub-nodes 804 and 806, in this example one (804) for financial information of the applicant and associated processing, and another (806) for information and processing associated with the home to be purchased using the loan. The "applicant information" sub-node 804 includes a first case leaf node 808 for Forms W-2 and a second case leaf node 810 for the applicant's tax returns. "Property" sub-node 806 includes case leaf nodes 812, 814, and 816 for the title report, appraisal report, and home inspection report, respectively. In various embodiments, the case model definition may include for each case node a definition of metadata and/or behaviors for that case node. For case leaf nodes, such as case leaf nodes 808, 810, 812, 814, and 816, the case model definition may include information regarding documents or other content objects to be associated with such nodes, including in some embodiments an identification of a storage location in which such documents are to be stored, e.g., in a content repository such as repository 214 of FIG. 2 associated with a content management system such as content management system 212 of FIG. 2.

Figure 9:
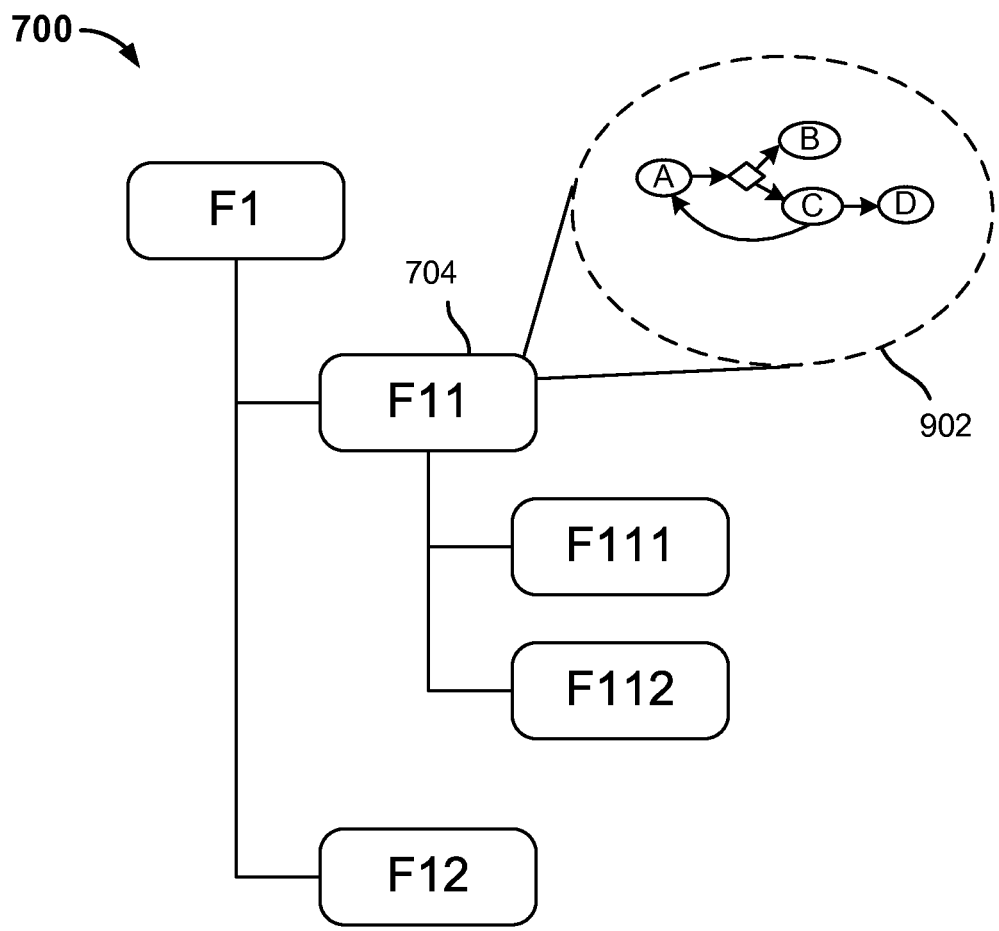
FIG. 9 is a block diagram illustrating an example of a hierarchical data model and associated state machine in an embodiment of a case management system.

FIG. 9 is a block diagram illustrating an example of a hierarchical data model and associated state machine in an embodiment of a case management system. In various embodiments, the hierarchical data model and associated state machine of FIG. 9 may be included in a case model definition defined and/or deployed via a case management system such as case management system 206 of FIGS. 2 and 3. In the example shown, a state machine 902 has been defined for and associated with case node 704 of hierarchical/nested container model 700 of FIG. 7.

In various embodiments, for any case node within the hierarchical/nested container model, a state machine can be defined and the actions that can be used to transition between different phases/states of the state machine defined for that case node may be specified. These actions could be used during runtime to transition between states.

In the example shown in FIG. 9, a state machine 902 has been defined and associated with a specific case node in the hierarchical model shown in FIG. 7, specifically node "F11" (704). In various embodiments, a document or other content associated with node "F11"; traits, such as metadata and/or associated behavior associated with node "F11"; etc. may be transformed, reviewed, and/or otherwise involved with processing that may result, in a given case model instance, in transitions being made between states of the state machine 902 defined for case node "F11" in this example.

In various embodiments, enabling a state machine to be defined and associated with a case node comprising a hierarchal/nested container model provides a flexible, dynamic framework within which ad hoc actions and/or information can be responded to, in a manner determined dynamically based on the circumstances of a given instance of a case, with the result that the actions and/or processing performed at a given case node, and/or the consequences of such actions and/or processing, may be different for one instance of the case model than for another instance of the case model.

In various embodiments, a state machine engine may be included in a case management system, such as case management system 206 of FIG. 2, to enable a state machine defined for a case node, such as state machine 902 of FIG. 9, to be implemented and associated functionality to be provided. For example, in some embodiments, case management module 310 of FIG. 3 may include a state machine engine. In some embodiments, the state machine engine may receive and parse state machine definition portions of a case model definition, and may use such portions to create and manage runtime data structures associated with the respective defined states (phases) of the state machine and transitions between them. In some embodiments, state variables associated with a current state of a case node-specific state machine for a given instance of a case model may be stored persistently with other case management instance data, for example in a case instance data store such as data store 312 of FIG. 3.

Figure 10:
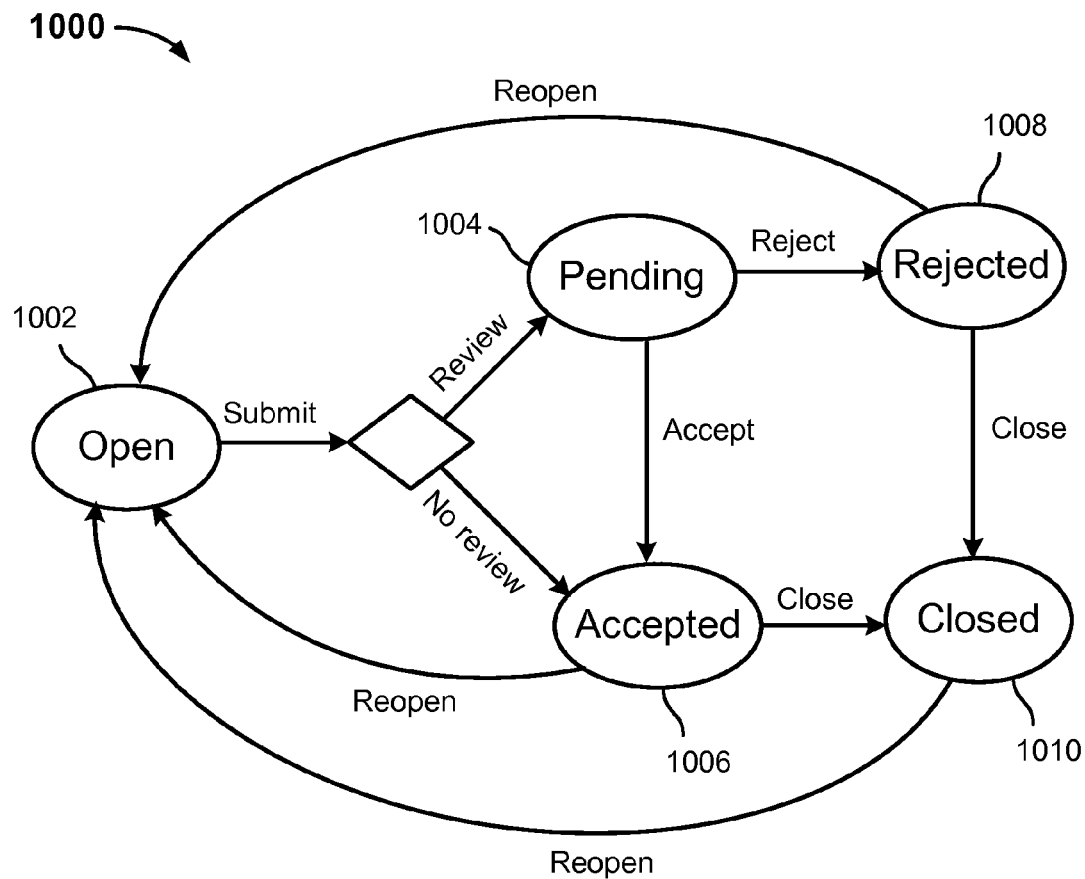
FIG. 10 is a block diagram illustrating an example of a state machine defined for a case node in an embodiment of a case management system.

FIG. 10 is a block diagram illustrating an example of a state machine defined for a case node in an embodiment of a case management system. In various embodiments, the state machine of FIG. 10 may be included in a case model definition defined and/or deployed via a case management system such as case management system 206 of FIGS. 2 and 3. In the example shown, state machine 1000 includes an "open" state 1002, associated for example with beginning processing of a received document, such as one created locally, uploaded, or otherwise provided by a user. In the example shown, a transition out of the "open" state 1002 may occur upon a "submit" option being selected, e.g., by a user, a business process, an external service, etc. If the item was submitted with an indication that a "review" is required (e.g., a reviewer is named or otherwise indicated), the state machine transitions to a "pending" state 1004, indicating the required review is pending. If no review is required, the state machine instead transitions directly to an "accepted" state 1006. If review was required and the reviewer "accepts" the item, a transition from "pending" state 1004 to "accepted" state 1006 occurs. If instead the reviewer were to "reject" the item, in this example a transition from "pending" state 1004 to "rejected" state 1008 would occur. From either "accepted" state 1006 or "rejected" state 1008, a "close" transition to a "closed" state 1010 could occur. Finally, in this example, "reopen" transitions back to "open" state 1002 could occur from the "accepted" state 1006, "rejected" state 1008, and/or "closed" state 1010.

Note that for a given instance of a case model with which the state machine 1000 of FIG. 10 is associated, the states through which the state machine 1000 of FIG. 10 may transition for that instance may be different than for one or more other instances. Also, for a given instance, depending on the state machine definition included in the case model definition, the user data associated with that instance at applicable times, and potentially user actions and decisions made in response to case information, the state machine 1000 may be transitioned to/through a given state more than once (e.g., via the "reopen" transitions), potentially resulting in different outcomes of processing associated with that state.

Figure 11:
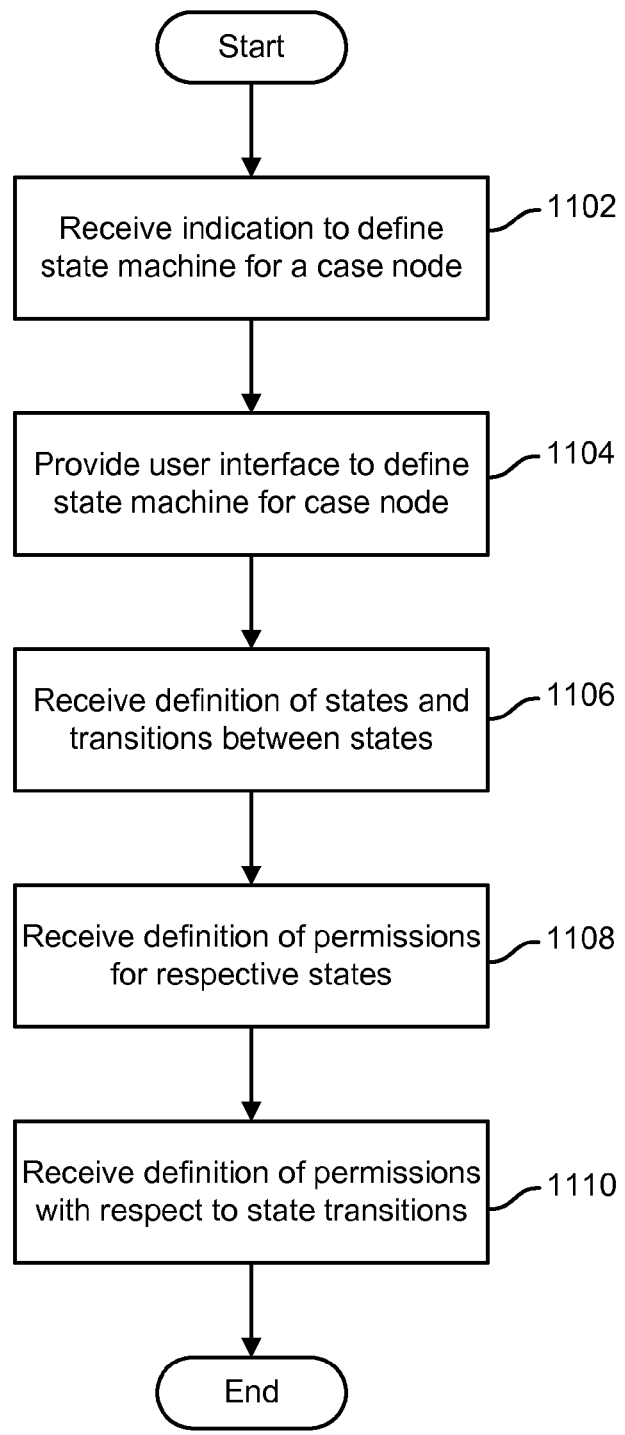
FIG. 11 is a flow chart illustrating an example embodiment of a process to define a state machine for a case node in an embodiment of a case management system.

FIG. 11 is a flow chart illustrating an embodiment of a process to define a state machine for a case node in an embodiment of a case management system. In various embodiments, the process of FIG. 11 may be performed by a case management system, such as case management system 206 of FIGS. 2 and 3. For example, in some embodiments, a case model development component such as case model development module 304 of FIG. 3 may include a development tool and/or feature to enable a state machine to be defined and associated with a case node, using the process of FIG. 11.

In the example shown in FIG. 11, an indication to define a state machine for a case node is received (1102). For example, a developer using a case model definition tool, service, and/or interface may select a case node and provide an input indicating that a state machine is desired to be defined for and associated with the selected node. A developer user interface to define a state machine for the case node is provided (1104). A definition of two or more states and transition(s) between them is received (1106). A definition of permissions associated with the respective states, e.g., who may access content or metadata associated with the case node while the state machine is in that state, is received (1108). A definition of permissions associated with transitions between the respective states, e.g., who may cause each transition to occur, is received (1110). In various embodiments, a state machine defined for a case node using the process of FIG. 11 may be included in the case model definition as stored and deployed, e.g., in a corresponding portion of an XML or other structured data file comprising the case model definition.

Figure 12:
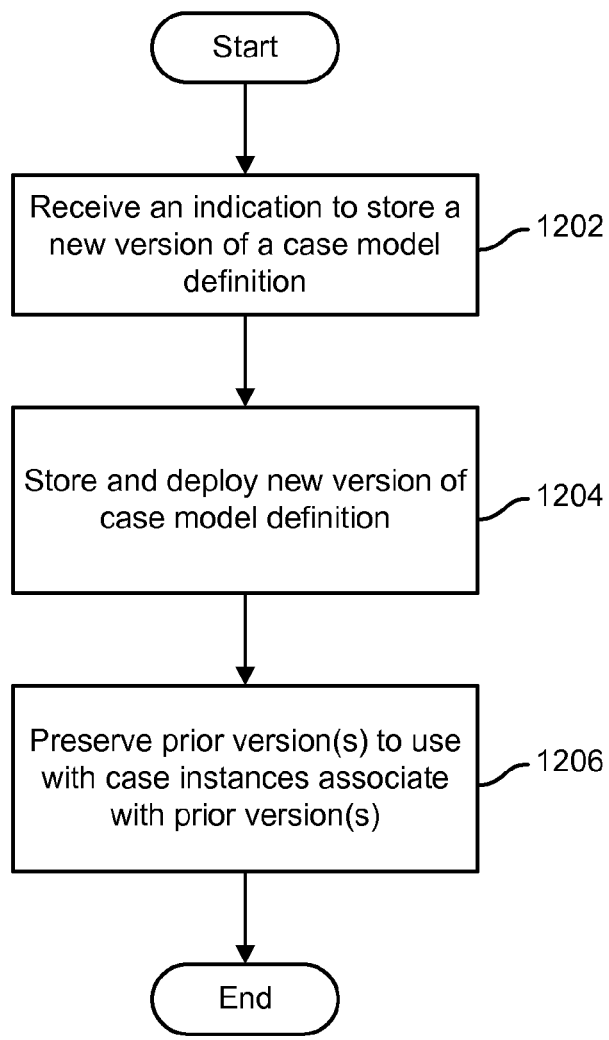
FIG. 12 is a flow chart illustrating an example embodiment of a process to provide case model versioning.

FIG. 12 is a flow chart illustrating an embodiment of a process to provide case model versioning. In various embodiments, the process of FIG. 12 may be performed by a case management system, such as case management system 206 of FIG. 2. In the example shown, an indication is received to store a new version of a case model definition (1202). The new version of the case model definition is stored and deployed (1204). In some embodiments, storing a new version of a case model definition includes assigning to the new version a version number or other version identifier. In some embodiments, the deploying a new version of a case model definition includes implementing one or more configuration of other rules associated with the new version. For example, if the case model developer has indicated that the new version should be used to govern both previously-stored and newly-created instances of the case model, the new version is deployed in a manner that results in the new version being used to instantiate both previously-stored and newly-created case instances. Conversely, if the developer indicated the new version should govern only instances created subsequent to deployment of the new version, or subsequent to a date specified by the developer, or a subset of instances determined based on some other criteria, then the new instance is deployed in a manner that ensures compliance with the rule(s) of version applicability specified by the developer. In the example shown in FIG. 12, the prior version(s) of the case model are preserved, in this example for use with case instances that remain associated with the prior version(s) (1206).

By way of example, assume a Loan Case Model version 1.0 has a policy giving a Loan Applicant permission to view Home Inspection Reports. And there are 100 instances created with this data and behavior model.

Now due to changes in policies/or other reasons Loan Applicants on loan applications initiated after a certain date are not permitted to see Home Inspection Reports any more. Assume this rule is applicable only to new Loan instances, e.g., those created after a certain date, and that applicants on applications created prior to that date are to remain able to view Home Inspection Reports. In various embodiments, a newer version of same Loan Case Model, say version 2.0, with newer, modified permissions, may be created and deployed. Providing the ability to deploy concurrently more than one version of a Case Model enables older loan instances to exhibit one behavior (Loan Applicant can view the Home Inspection Report) and newer instances, created based on the later case model version, which defines the new permission behavior, will exhibit the new behavior (Loan Applicant cannot view the Home Inspection Report), with all instances sharing content and behavior that is not changed in the newer version.

Similarly, in various embodiments different versions of a Case Model may have differences in their hierarchical/nested container (data) model. For example, additional and/or modified Case Nodes and/or associated content and/or behavior, may be present. Each Case Model instance will have a data model as defined by the Case Model version based on which it was created. In the example shown in FIG. 8, for example, a new requirement may arise, e.g., due to new government regulations, to capture data reflecting the level of risk determined to be associated with a loan. A new case node "Risk" may be added, for example, to the hierarchical data model of FIG. 8, and made accessible only to the user have the case role "Underwriter", to be used for example to upload credit risk-related documents, information, and underwriter's notes, for example. The new version of the model may be stored as version 2.0, for example. Loan instances created based on the new version would include the node "Risk" and exhibit associated behaviors, while loan instances created based on earlier versions would still function but would not include the added case node.

Likewise, a new version in some embodiments may include changes to case node-specific state machines, such as the one in FIG. 10. For example, a further state of "Supervisor Approval" may be interposed between the "pending" and "accepted" states. A definition of the state machine, revised to include the additional state and transitions to/from that sate, may be created and stored as a new version. Instances created after deployment of the new version would include the new state and transitions, while instances created based on the prior version would continue to use the prior version of the case model and would not include the new state.

In some embodiments, each Case Model instance stores and/or otherwise has associated with it meta-data that indications the Case Model version that governs that instance.

Figure 13:
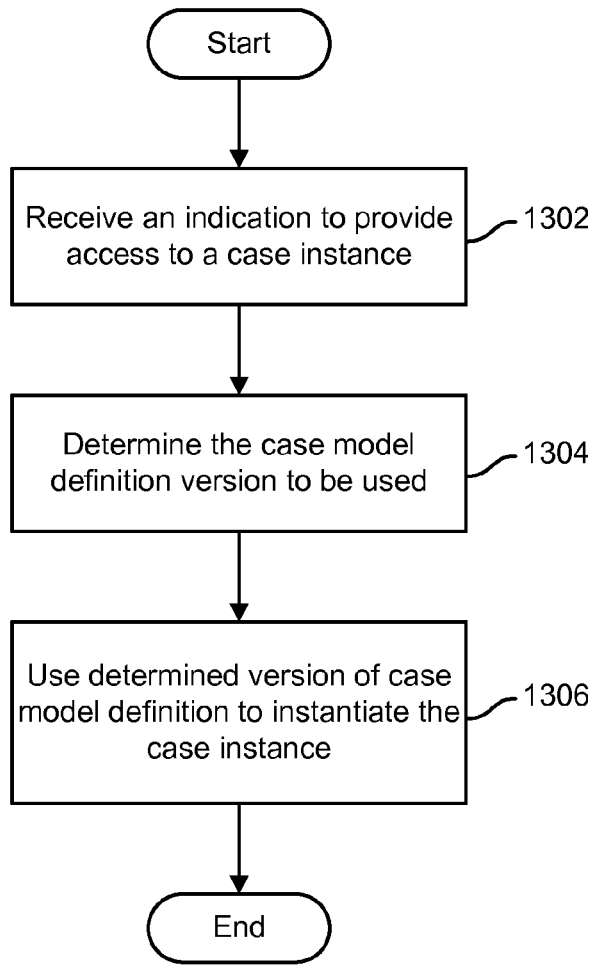
FIG. 13 is a flow chart illustrating an example embodiment of a process to instantiate a case instance in a case management system that provides case model versioning.

FIG. 13 is a flow chart illustrating an embodiment of a process to instantiate a case instance in a case management system that provides case model versioning. In various embodiments, the process of FIG. 13 may be performed by a case management system, such as case management system 206 of FIG. 2. In the example shown, an indication to provide access to a case instance is received (1302). For example, a request to create a new case instance based on a case model specified in the request may be received. Alternatively, a request to access and use a previously-created case instance may be received. A case model definition version to be used to instantiate the case instance is determined (1304). For example, in the case of creating a new case instance, a "current" (e.g., most recently stored) version may be determined, or one or more criteria provided by the developer may be used to determine the version to be used (e.g., version A.0 for a case instance associated with enterprise X, version B.2 for a case instance associated with a user in region Y). The determined case model version is used to instantiate the case instance (1306). For example, the determined version of the case model may be read from a case model definition data store and used to create a runtime instance of the case instance.

Figure 14:
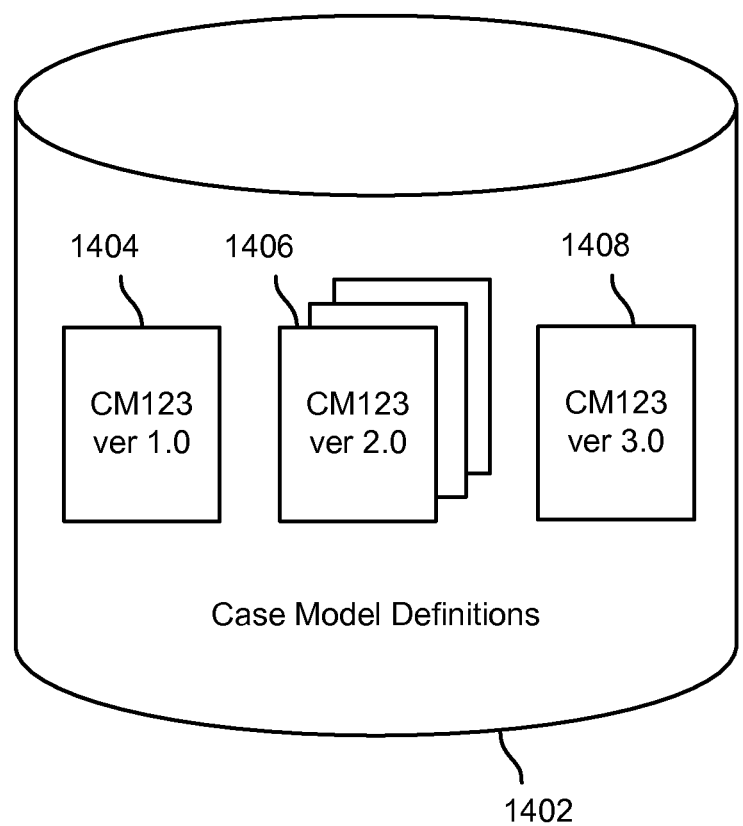
FIG. 14 is a block diagram illustrating an example embodiment of a case management system to provide case model versioning.

FIG. 14 is a block diagram illustrating an embodiment of a case management system to provide case model versioning. In some embodiments, a case management system such as case management system 206 of FIG. 2 and/or FIG. 3 may include support of case model versioning as illustrated in FIG. 14. In various embodiments, a case management system that provides case model version as illustrated in FIGS. 12 and 13 may include a case model definition data store as shown in FIG. 14. In the example shown, case model definition data store 1402, e.g., a database and/or a set of XML or other files, includes different versions of a case model named "CM123" in the example shown. Specifically, in this example versions 1.0 (1404), 2.0 (1406), and 3.0 (1408) of the case model "CM123" have been stored. In addition, minor versions of CM123 version 2.0 (e.g., 2.1, 2.2, etc.) have been stored (shown in FIG. 14 as additional documents/files stacked behind CM123 v. 2.0 as shown.

In various embodiments, support of case model versioning enables a same case model to be used for instance created over a period of time and/or across enterprise, regulatory, and/or other domains, with different versions of the case model being used as appropriate to ensure that each case instance provides the functionality and processing required for that instance.

Although the foregoing embodiments have been described in some detail for purposes of clarity of understanding, the technology is not limited to the details provided. There are many alternative ways of implementing the technology. The disclosed embodiments are illustrative and not restrictive.

What is claimed is:

1. A method of managing a case, comprising:
at a computer having a processor and at least one non-transitory memory, the at least one non-transitory memory containing instructions causing the processor to:
deploy a first version of a case model, the first version of the case model defining a hierarchy of case nodes, wherein each case node comprises a hierarchical container, and each case node of the first version of the case model is associated with user data or behaviors from a first set of user data or behaviors;
generate a first set of case instances using the first version of the case model;
deploy a second version of the case model, the second version of the case model associated with user data and behaviors from a second set of user data and behaviors, wherein the second set of user data and behaviors includes at least one behavior or item of user data from the first set of user data and behaviors;
store, in the non-transitory memory, the first version of the case model and the second version of the case model, the second version having in common with the first version at least a subset of a case model definition comprising the first version of the case model;
responsive to deploying the second version of the case model, updating the case instance data of the first set of case instances to associate the first version of the case model with the first set of case instances associated with the case model, the first set of case instances generated prior to deployment of the second version of the case model;
generate a second set of case instances using the second version of the case model; and
associate the second version of the case model with the second set of case instances associated with the case model.

2. The method of claim 1, wherein the second version of the case model reflects a change to a hierarchical data model defined by the first version of the case model.

3. The method of claim 1, wherein the second version of the case model reflects a change to a behavior associated with a case node of the first version of the case model.

4. The method of claim 1, wherein storing the second version of the case model includes receiving via a case model developer user interface an indication to store the second version of the case model.

5. The method of claim 4, wherein the second version of the case model is created at least in part via user inputs received via the case model developer user interface.

6. The method of claim 1, wherein the first set of case instances comprises case instances created prior to a specified date.

7. The method of claim 6, wherein the specified date comprises an effective date on which the second version of the case model was deployed.

8. The method of claim 6, wherein the second set of case instances comprises case instances created on or after the specified date.

9. The method of claim 1, further comprising receiving an indication to provide access to a requested case instance associated with the case model, and determining whether the requested case instance is associated with the first version or the second version of the case model.

10. The method of claim 9, further comprising using the determined version of the case model to instantiate the requested case instance.

11. The method of claim 1, wherein associating the first version of the case model with a first set of case instances associated with the case model includes storing in the respective case instance data associated with each case instance in the first set a case model version identifier associated with the first version.

12. The method of claim 11, further comprising using the stored case model version identifier to determine to use the first version of the case model to instantiate a case instance included in the first set.

13. A case management system, comprising:
a storage device; and
a processor coupled to the storage device and a non-transitory memory containing instructions causing the processor to:
deploy a first version of a case model, the first version of the case model defining a hierarchy of case nodes, wherein each case node comprises a hierarchical container, and each case node of the first version of the case model is associated with user data or behaviors from a first set of user data or behaviors;
generate a first set of case instances using the first version of the case model;
deploy a second version of the case model associated with user data and behaviors from a second set of user data and behaviors, wherein the second set of user data and behaviors includes at least one behavior or item of user data from the first set of user data and behaviors;
store in the storage device the first version of the case model and the second version of the case model, the second version having in common with the first version at least a subset of a case model definition comprising the first version of the case model;
responsive to deploying the second version of the case model, update case instance data of the first set of case instances to associate the first version of the case model with the first set of case instances associated with the case model, the first set of case instances generated prior to deployment of the second version of the case model;
generate a second set of case instances using the second version of the case model; and
associate the second version of the case model with the second set of case instances associated with the case model.

14. The system of claim 13, wherein the second version of the case model reflects a change to a hierarchical data model defined by the first version of the case model.

15. The system of claim 13, wherein the second version of the case model reflects a change to a behavior associated with a case node of the first version of the case model.

16. The system of claim 13, wherein the first set of case instances comprises case instances created prior to a specified date.

17. The system of claim 13, wherein the processor is further configured to receive an indication to provide access to a requested case instance associated with the case model, and to determine whether the requested case instance is associated with the first version or the second version of the case model.

18. A computer program product to manage a case, the computer program product being embodied in a non-transitory computer readable storage medium and comprising computer instructions for:
- deploying a first version of a case model, the first version of the case model defining a hierarchy of case nodes, wherein each case node comprises a hierarchical container, and each case node of the first version of the case model is associated with user data or behaviors from a first set of user data or behaviors;
- generating a first set of case instances using the first version of the case model;
- deploying a second version of the case model, the second version of the case model defining a hierarchy of case nodes associated with user data and behaviors from a second set of user data and behaviors, wherein the second set of user data and behaviors includes at least one behavior or item of user data from the first set of user data and behaviors;
- storing the first version of the case model and the second version of the case model, the second version having in common with the first version at least a subset of a case model definition comprising the first version of the case model;
- responsive to deploying the second version of the case model, updating the case instance data of the first set of case instances to associate the first version of the case model with the first set of case instances associated with the case model, the first set of case instances generated prior to deployment of the second version of the case model; and
- generating a second set of case instances using the second version of the case model; and
- associating the second version of the case model with the second set of case instances associated with the case model.

19. The computer program product of claim 18, wherein the second version of the case model reflects a change to a hierarchical data model defined by the first version of the case model.

20. The computer program product of claim 18, wherein the second version of the case model reflects a change to a behavior associated with a case node of the first version of the case model.

* * * * *